J. C. HENDERSON.

Heating Stove.

No. 622. Reissued Nov. 9, 1858.

Witnesses:

A. V. Delbritt

Oscar J. Reinhard

Joseph C. Henderson

N. PETERS, Photo-Lithographer, Washington, D. C.

UNITED STATES PATENT OFFICE.

JOSEPH C. HENDERSON, OF ALBANY, NEW YORK.

IMPROVEMENT IN STOVES.

Specification forming part of Letters Patent No. 20,274, dated May 18, 1858; Reissue No. 622, dated November 9, 1858.

*To all whom it may concern:*

Be it known that I, JOSEPH C. HENDERSON, of Albany, in the State of New York, have invented, made, and applied to use certain new and useful Improvements in the Combustion-Chambers of Stoves, Furnaces, or Heaters; and I do hereby declare that the following is a full, clear, and exact description of the nature of my said invention, reference being had to the annexed drawings, making part of this specification, wherein—

Figure 2:
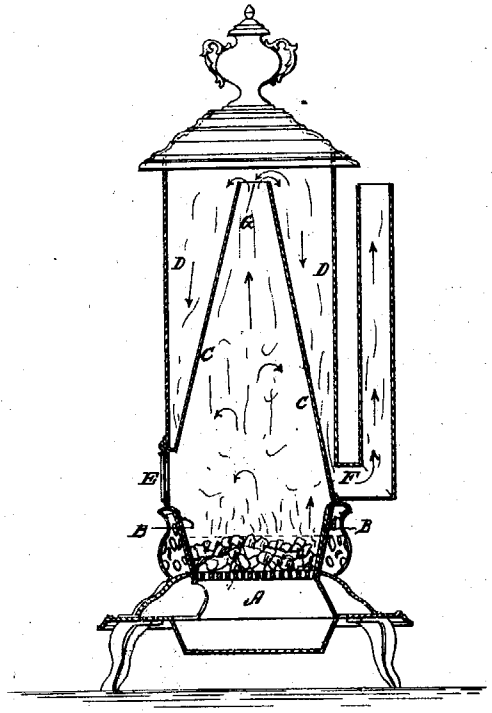
Figure 1:
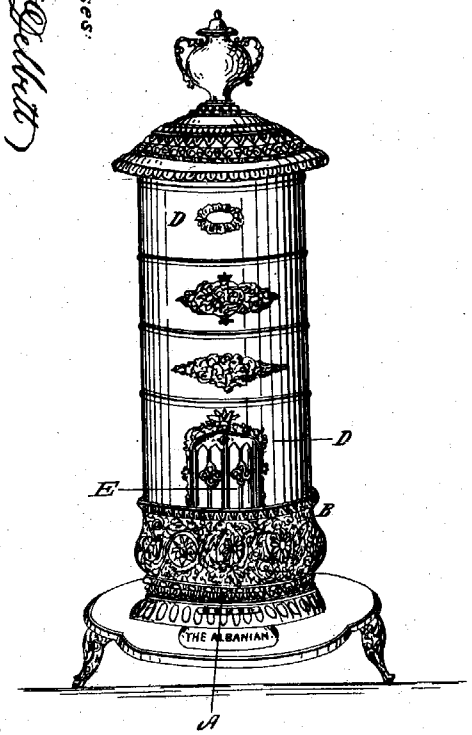

Figure 1 is a perspective view of a stove containing my improvements, and Fig. 2 is a vertical section of the same.

Similar marks of reference indicate the same parts.

The nature of my said invention consists of a combustion-chamber above the fire and within a radiating-chamber, whereby the products of combustion—such as the smoke and gases from bituminous and other coals or fuel—are confined within the first or combustion-chamber, where they are submitted to sufficient heat to produce a perfect combustion, and then they pass into the outer casing forming the radiating-chamber, from which the heat is communicated to the surrounding atmosphere or to the substance to be heated.

In the drawings I have shown my invention as applied to a stove; but the same may be used in a boiler-furnace or other heater, wherever available.

A is the base forming the ash-pit. 1 is the grate, and B is the fire-box. E is the door for the entrance of fuel. C is the frustum of a cone forming the combustion-chamber. G is the orifice from which the products of combustion pass into the radiating-chamber D, from the base of which chamber the flue F passes to a suitable chimney.

The operation of this apparatus is that the smoke and gases are confined within the combustion-chamber C, the orifice G being of a regular size for this purpose, or variable by a damper or otherwise, so as to produce a plenum within said chamber C, and the truncated tone becoming highly heated, because it does not act as a radiating-surface, increases the temperature of the gases and causes them to mix and commingle in such a manner, while retained by the contraction G at the top of the chamber that all smoke and combustible matters are consumed, and the heated gases passing into the chamber D impart their heat by radiation through the casing to the surrounding air, and the flue F, being near the bottom of the chamber D, produces a plenum in the said chamber D. A secondary supply of air might be introduced above the fuel at the base of the chamber C; but where the admission of draft is properly regulated this is not necessary.

In the manufacture of gas from coal and other substances an operation takes place that may serve as an illustration of the manner in which my invention operates, viz.: The retort into which the coal is placed must be heated to such a degree that the gases are driven off, not as a smoky mass similar to combustion in the atmosphere, but as a nearly colorless hydrocarbon produced by the heat, so in my heater the cone or chamber above the fire, not acting as a radiating or conducting surface, but having heat on both sides, is raised to such a temperature that a complete combination of the elements of combustion is effected, because the said cone, being contracted sufficiently at its apex or opening into the outer chamber, is converted into a transmitting-retort that will not allow (when properly proportioned) the escape of any smoke or unconsumed carbonaceous matter; hence a stove constructed on my plan, so soon as the fire is thoroughly kindled and burning, will not pass sufficient smoke from bituminous or similar coals to even soil or adhere to the outside of the cone C; consequently a great saving is effected in the coal, and all trouble from smoke is avoided, and the combustion of bituminous coal rendered as cleanly and agreeable as that of anthracite.

In cases where my invention is applied in steam or other boilers or heaters the clogging up of flues by an accumulation of soot is prevented.

The chamber C may be constructed of fire-brick, soapstone, or other material, although for ordinary purposes I prefer substantial cast-iron.

It will be apparent that the size and proportions of the parts must be varied and determined according to the character of the stove, furnace, or heater and the fuel made use of; and I do not limit myself in any of these particulars so long as the following three elements are found, namely: First, a furnace or fire-box in which the primary combustion takes place; second, a non-radiating combustion-chamber above the fuel, where a secondary combustion or combination of the products of the first combustion is made to take place by the heat and contraction of the outlet from said chamber; and, third, a heating or radiating chamber or device intervening between the surface to be heated, for the purposes of radiation or conduction, and the aforesaid secondary combustion-chamber.

I am aware that a tapering or contracting flue or chamber has been used over the fire-pot for the purpose of detaining the products of combustion and causing said tapering chamber to receive and radiate heat. A stove has also been made with a parallel cylinder within the exterior cylinder, but this simply formed an exterior descending flue, and did not produce any plenum in the space over the fire to detain and increase the heat and produce a secondary combustion as above the fire.

What I claim as my invention, and desire to secure by Letters Patent, is—

The non-radiating combustion-chamber with a contracted orifice or throat producing a plenum in said chamber, in combination with a fire box or pot, and with an exterior chamber surrounding said combustion-chamber, and from which exterior chamber the heat is taken by radiation or conduction, substantially as set forth.

In witness whereof I have hereunto set my signature this 15th day of October, 1858.

JOSEPH C. HENDERSON.

Witnesses:

A. V. DE WITT,

OSCAR G. BURCHARD.